Aug. 17, 1926
W. B. JAMES
COMBINED FISH LURE AND STRIKER
Filed Jan. 4, 1924
1,596,103
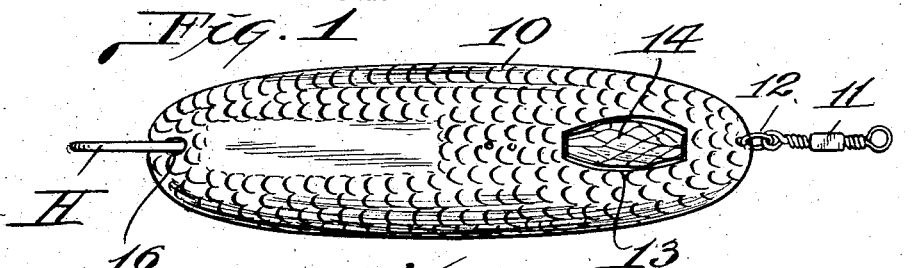
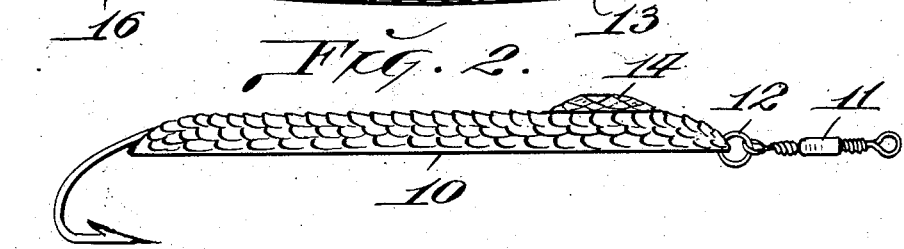
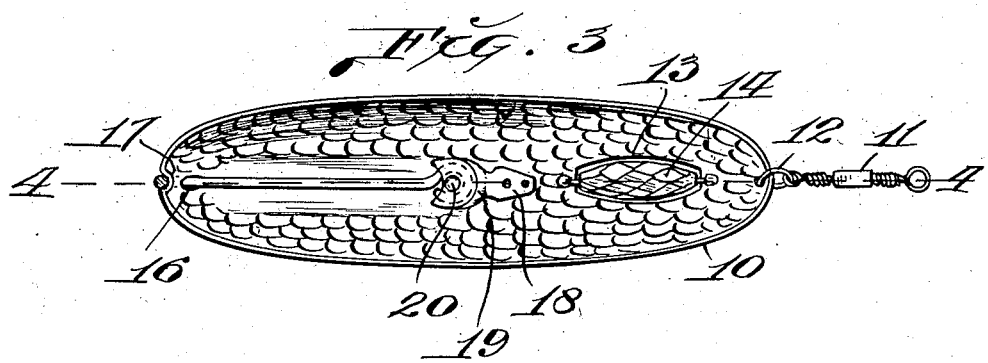
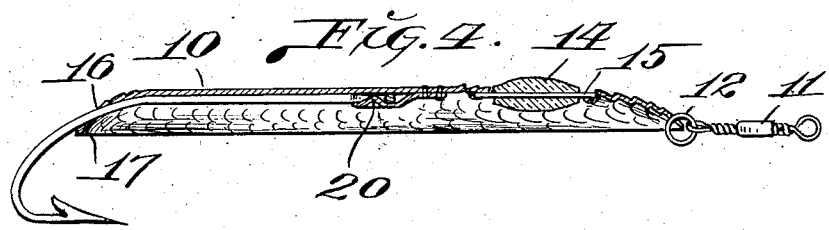
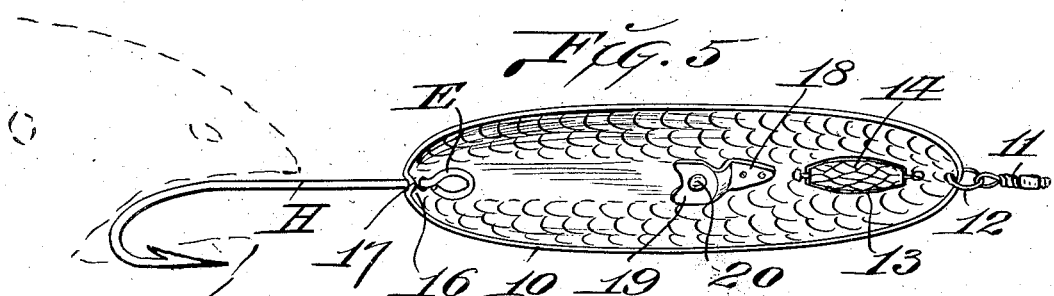
INVENTOR,
William B. James.
By Martin P. Smith ATTY.

Patented Aug. 17, 1926.

1,596,103

UNITED STATES PATENT OFFICE.

WILLIAM B. JAMES, OF LOS ANGELES, CALIFORNIA.

COMBINED FISH LURE AND STRIKER.

Application filed January 4, 1924. Serial No. 684,302.

My invention relates to a combined fish lure and striker, the principal objects of my invention being to generally improve upon and simplify the construction of the existing forms of similar devices; to provide a device that will sparkle and glisten as it is drawn through the water, thereby providing a particularly attractive lure for fish; to provide a combined fish hook and striker wherein the hook is mounted so as to have a certain amount of longitudinal movement upon the spoon-like body of the device, thus providing for a "striking" action of said hook when the lure is engaged or "struck" by a fish, and further to provide a device of the character referred to, that may be easily and cheaply produced and which possesses superior advantages in point of simplicity, durability and efficiency.

With the foregoing and other objects in view, my invention consists in certain novel features of construction and arrangement of parts that will be hereinafter more fully described and claimed and illustrated in the accompanying drawings, in which:—

Figure 1 is an elevational view of a combined fish lure and striker of my improved construction.

Figure 2 is an edge view of the device.

Figure 3 is an elevational view of the device looking against the concave side thereof.

Figure 4 is a longitudinal section taken on the line 4—4 of Fig. 3.

Figure 5 is a perspective view of the device with the hook drawn outward as when struck by a fish.

Referring by numerals to the accompanying drawings, 10 designates an elongated spoon-shaped body that is preferably formed of sheet metal and polished or plated so as to provide bright shining surfaces.

The greater portion of this body 10 is preferably formed with small semi-circular indentations that are intended to represent the scales of a fish and which tend to reflect light rays so as to produce a flashing or scintillating effect as the lure is drawn through the water.

An ordinary swivel is connected by a link 12 to the forward end of the body 10, said swivel serving as a point of attachment for a line (not shown).

Formed in the forward portion of the body 10 is an oval-shaped aperture 13 and arranged therein is an elongated bead-like member 14, of clear or colored glass and which is mounted to rotate freely upon a small rod or pin 15 that extends lengthwise of the aperture 13 and the ends of said rod or pin being secured to body 10.

Formed near the rear end of body 10 is an aperture 16, preferably elongated or oval in shape and of such size as to receive the pointed or barbed end of a fish hook, such as H, and the metal between this aperture and the rear end of plate 10 is indented or bent inward to form a semi-circular seat 17 that receives the shank of the hook when the latter is drawn inwardly onto the body 10 (see Fig. 3).

Secured in any suitable manner to the central portion of the concave face of body 10 is one end of a clip 18, the rear end portion 19 of which is bent outward a short distance away from the face of the body and said portion is indented to form an inwardly projecting stud 20.

When the hook H is positioned on the concave face of body 10, the eye E at the end of said hook occupies a position beneath portion 19 of clip 18 and stud 20 engages in said eye, thereby firmly holding the hook in position on the spoon-shaped body, with the curved and pointed end of said hook located immediately adjacent to the rear end of said body (see Figs. 3 and 4).

That portion of the concave face of the body 10, between clip 18 and aperture 16 is preferably left smooth so that the hook will lie flat against said body and will move freely thereover when said hook is struck by a fish and drawn rearwardly relatively to said body.

When my improved fish lure and striker is in use, the hook H is drawn into position on the body 10 and retained in such position by the engagement of eye E beneath portion 19, of clip 18 and by the engagement of lug 20 in said eye. The lure is trolled through the water at the end of a line and the spoon shape of the body 10 causes the same to dart in different angular directions simultaneous with the forward movement, thus simulating the movements of a small fish. The bright indented surfaces of the body reflect the light so as to produce a scintillating effect and this result is greatly enhanced by the flashing effect produced by the facets on member 14, and which latter rotates rapidly as the device is drawn through the water.

In the event that a fish attracted by the flashing, darting lure, strikes the same and is caught or impaled on the hook, the latter will be jerked, or drawn with sudden movement rearwardly until the eye E bears against the rear end of body 10 and this action tends to more firmly "hook" or engage the fish, particularly if the pointed end of the hook enters a relatively hard or bony portion of the mouth.

In the event that the point or barb of the fish hook becomes broken or bent so as to render it unfit for service, the hook may be readily manipulated so as to draw its shank and pointed end through aperture 16 and a new hook inserted.

Thus it will be seen that I have provided a fish lure and striker that is of relatively simple structure, capable of being easily and cheaply produced and which is very effective in performing its intended functions.

Obviously minor changes in the size, form and construction of the various parts of my improved combined fish lure and striker may be made and substituted for those herein described without departing from the spirit of the invention, the scope of which is set forth in the appended claims.

I claim as my invention:—

1. In a combined fish lure and striker, an elongated spoon-shaped member having an aperture near its forward end, a beadlike member mounted for rotary movement within said aperture and a hook mounted for sliding and pivotal movement upon the rear portion of said spoon-shaped member.

2. In a combined fish lure and striker, an elongated spoon-shaped plate provided with a hook shank receiving aperture near its end, a hook eye receiving clip secured to the central portion of said plate, a stud projecting inwardly from said clip and adapted to engage said hook eye, there being an opening near the forward end of said plate and a transparent member arranged within said aperture.

3. In a combined fish lure and striker, an elongated spoon-shaped plate provided near its rear end with an aperture, a hook mounted for sliding movement on said spoon-shaped member with its shank passing through said aperture, a clip secured to the central portion of the inner face of said spoon-shaped member and a stud projecting inwardly from said slip and adapted to engage in the eye on the end of the shank of said hook.

In testimony whereof I affix my signature to this specification.

WILLIAM B. JAMES.